United States Patent [19]

Zavagli et al.

[11] 4,115,376

[45] Sep. 19, 1978

[54] BLAND NEUTRALIZED CASEIN

[75] Inventors: Steven B. Zavagli, Elmwood Park; Robert L. Kasik, Berwyn, both of Ill.

[73] Assignee: Beatrice Foods Co., Chicago, Ill.

[21] Appl. No.: 658,906

[22] Filed: Feb. 18, 1976

Related U.S. Application Data

[63] Continuation of Ser. No. 455,511, Mar. 27, 1974, abandoned.

[51] Int. Cl.² ............................................. A23J 3/02
[52] U.S. Cl. ................................. 260/120; 426/580; 426/657
[58] Field of Search ............... 426/580, 657; 260/119, 260/120

[56] References Cited

U.S. PATENT DOCUMENTS

| 2,714,068 | 7/1955 | Bernhardt et al. | 426/580 X |
| 2,832,685 | 4/1958 | Scott | 426/580 |
| 3,040,018 | 6/1962 | Wingerd | 426/580 X |

OTHER PUBLICATIONS

Sutermeister et al., "Casein and its Industrial Applications", Reinhold Publ. Corp., 1939, pp. 84–89 & 94.

Primary Examiner—Robert A. Yoncoskie
Attorney, Agent, or Firm—Murray and Whisenhunt

[57] ABSTRACT

Bland, white, neutralized casein is formed by heating a slurry of casein granules and neutralizing the casein with a magnesium or potassium base. The casein granules are preferably produced by mixing acid milk casein granules with a heated neutral salt solution, e.g., magnesium or potassium salts, to form a coagulum. The coagulum is separated from the salt solution and then treated with the magnesium or potassium base.

14 Claims, 3 Drawing Figures

BLAND NEUTRALIZED CASEIN

This is a continuation of application Ser. No. 455,511, filed Mar. 27, 1974, now abandoned.

The present invention is concerned with bland neutralized caseins and particularly, such caseins which are sufficiently devoid of taste that they can be contained in conventional foodstuffs in relatively large proportions. Even more particularly, the invention is concerned with such bland caseins which exhibit physical properties such that they can be readily incorporated into conventional aqueous foodstuffs.

BACKGROUND OF THE INVENTION

Neutralized caseins are produced by precipitating the protein fraction of milk or milk products with acids to produce acid casein and then neutralizing the acid casein with an alkali. The neutralized casein is referred to as the salt, or caseinate, of the corresponding alkali. However, it has never been entirely clear in the art that the neutralized caseins are, indeed, salts, at least in the usual sense of the word. In the present invention, the evidence does not point to a salt, per se, and therefore the term "neutralized casein" will be used herein to describe the present material and to emphasize the difference over conventional materials of the present nature, which may be properly called caseinates.

As noted above, acid casein is precipitated from milk or milk fractions by the action of an acid (with or without the aid of a milk clothing enzyme, e.g., a rennet enzyme). For example, lactic acid may be added to milk or milk fractions or produced in situ from organisms grown therein, and the corresponding lactic casein will precipitate. Alternately, a mineral acid, such as hydrochloric acid, may be added to the milk or milk fraction to precipitate the acid casein. The acid casein is usually treated with a base to form the caseinate (principally sodium hydroxide to form sodium caseinate).

Whether the casein is in the form of a caseinate or acid casein, the art has long appreciated that the casein contains over 90% protein and can provide an exceptionally important source of protein for foodstuffs. However, the acid caseins have a relatively unpleasant "acid" taste and the caseinates have a relatively unpleasant consistency in the mouth (referred to as mouth-feel), i.e., a somewhat soapy mouth feel. In view thereof, the amount of either acid casein or conventional caseinate which may be added to foodstuffs is considerably limited. Generally speaking, foodstuffs will not contain more than about 5% of the acid casein or caseinate or otherwise the unpleasant flavors and consistencies adversely affect consumer acceptance of the foodstuff.

The art has long sought ways of treating acid casein and caseinate so as to render the taste and mouth-feel more acceptable to the consuming public. Some success has been met in these regards and as a result, higher proportions of acid casein and caseinate are now possible in conventional foodstuffs. Nevertheless, the acid casein and caseinate previously available contain more objectionable flavor and consistency components than is desirable and the taste and mouth-feel of foodstuffs containing these greater amounts of the casein or caseinate are often adversely affected.

In co-pending applications Ser. Nos. 276,168 and 276,169, both filed on July 28, 1972, processes are described for improving the blandness of caseinates. In one process, a caseinate, e.g., sodium caseinate, is slowly heated with a magnesium salt, e.g., magnesium chloride, to produce a more bland caseinate. In the other process, the caseinate is rapidly mixed with a hot solution of the salt. While these processes do, indeed, produce a bland product, substantial amounts of the caseinate are lost in the solution due to the high solubility of the sodium caseinate. Thus, the processes considerably increase the cost of the recovered caseinates. Further, the product still has some undesired mouth-feel and taste, which is now believed to be a result of the residual amounts of sodium or calcium (from the starting caseinates) which remain in the product. Also, the physical properties of the product are not as desired, especially in regard to mixing with aqueous compositions.

It would, therefore, be of advantage in the art to provide an extremely bland casein which can be incorporated in foodstuffs in relatively large amounts and which does not have undesired taste or mouth-feel.

OBJECTS OF THE INVENTION

It is therefore an object of the invention to provide a bland neutralized casein which has essentially no taste whatsoever. It is a further object of the invention to provide a bland neutralized casein wherein relatively large amounts can be incorporated into conventional foodstuffs without an unacceptable mouth-feel resulting in those foodstuffs. It is yet a further object of the invention to provide an improved neutralized casein which can be readily dispersed and dissolved in an aqueous solvent, whereby prior difficulties in mixing conventional caseinates with foodstuffs are obviated. It is yet a further object to provide methods for production of the foregoing neutralized casein. Other objects will be apparent from the following disclosure and claims.

BRIEF DESCRIPTION OF THE INVENTION

Very briefly stated, it has been found that a neutralized casein of the above-described properties can be obtained by certain modes of treating casein granules with a magnesium base. Preferably, the casein is first treated with an alkali or alkaline earth salt solution to form a coagulum and the coagulum is then neutralized with the magnesium base. When carrying out these steps under the below-described conditions, the resulting neutralized casein is white in color and has essentially no taste. Additionally, and surprisingly, the present neutralized casein exhibits elastic properties in water.

The process, in more detail, involves forming a water slurry of casein at a temperature of between 100° F. and 210° F. A non-toxic water soluble magnesium base is added to the slurry in an amount sufficient to produce the corresponding magnesium neutralized casein. The neutralized casein is then separated from the slurry to produce white, bland neutralized casein. It is preferred that the casein be produced by first mixing casein granules with a neutral salt solution, e.g., magnesium salt solution, heated to at least 150° F., e.g., at least 180° F. This causes the formation of a coagulum of the casein. In the preferred process, the casein granules are acid casein granules.

BRIEF DESCRIPTION OF THE DRAWINGS

The drawings illustrated the preferred modes of the invention.

DETAILED DESCRIPTION OF THE INVENTION

Figure 1:
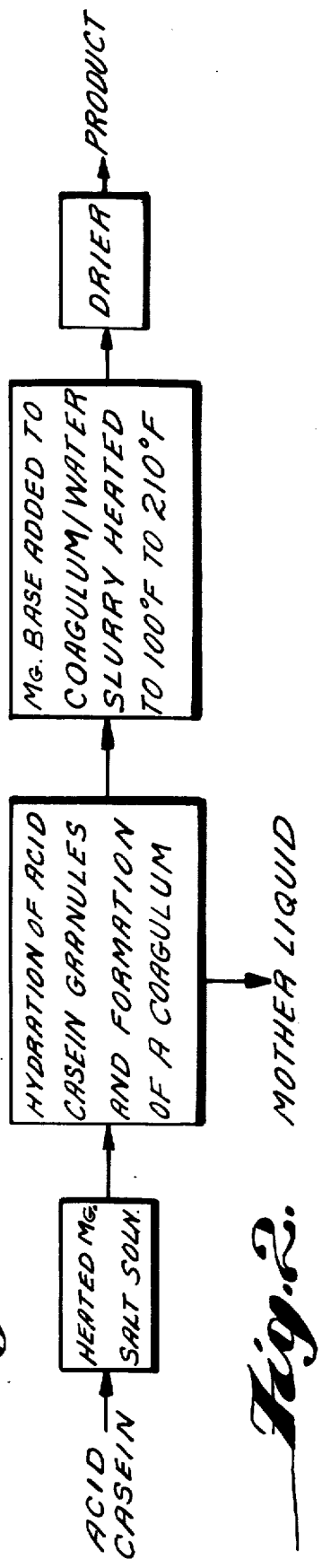
FIG. 1 is a block diagram illustrating the steps to be performed in the most preferred embodiment of the process.

In the preferred embodiment of the process, a solution of a neutral, non-toxic salt, e.g., a magnesium salt, is heated to an elevated temperature and acid casein is added with vigorous stirring. The acid casein will rapidly hydrate in the salt solution and form a coagulum. The rapid hydration causes a rapid swelling of the casein granules so that the granules are opened to the extent that occluded components therein are amenable to dissolution in the heated salt solution and subsequent magnesium base solution. This solvation of these components changes the color of the acid casein from a yellowish color to a whitish color during formation of the coagulum. The coagulum is also much cleaner in appearance than the original acid casein. The coagulum is formed of a multitude of individual curds which adhere together to form a dough-like coagulum mass which will generally rise to the top of the magnesium salt solution. The coagulum is of a bread dough-like consistency and will generally have solid contents of between 20 and 75% by weight, the remainder being the mother liquid of the salt solution and the components dissolved from the acid casein. The mother liquid is then separated from the coagulum, e.g., by draining, and if desired, the coagulum may be washed at this point.

The amount of salt dissolved in the water for the first step of the process is not narrowly critical, but the amount should be sufficient to promote the rapid hydration of the acid casein granules and to allow the undesired components of the acid casein to be dissolved therefrom. While any alkali or alkaline earth, non-toxic, water-soluble salt may be used, the cation of the salt does affect the final product. Thus, while, for example, sodium, calcium and aluminum salts may be used, the magnesium salts are preferred. This is because the cations which remain in the product can affect the properties of the product. In this regard, it has been found that the magnesium ions retained in the hydrated coagulum assist in providing an elastic character to the resulting neutralized casein. For purposes of simplicity, therefore, the salt will hereinafter be referred to as the magnesium salt, the preferred embodiment. Generally speaking, the weight percent of magnesium salt in the water solution must be at least 0.1% in order to produce this rapid hydration, but up to about 10% may be used. Amounts greater than this begin to adversely affect the final product. However, it is preferred to operate within a more narrow range. Thus, it is preferred that the weight percent of magnesium salt be from 0.5 to 5% and especially from 0.8 to 2% by weight. The optimum amount of magnesium salt is approximately 1% by weight. These percentages are based on magnesium chloride, a simple and preferred salt. For other non-toxic water-soluble magnesium salts, the percentages should be adjusted to account for different molecular weights and different ratios of cation to anion.

The magnesium salt may be any non-toxic water-soluble salt. Thus, the magnesium salt may be a halogen salt, e.g., chloride, a sulfo-salt, e.g., sulfate, a nitro-salt, e.g., nitrate, a phospho-salt, e.g., phosphate, or an acetate salt or mixtures thereof. However, since it is additionally preferred that the acid casein not be substantially changed in pH during treatment with the magnesium salt, it is further preferred that the magnesium salt be an essentially neutral salt, i.e., one which does not substantially change the pH of the acid casein placed in the solution (i.e., does not change the pH thereof more than ± one pH unit.)

The amount of acid casein in the form of casein granules which can be added to the magnesium salt solution can vary considerably, and there is no theoretical lower limit. However, from a practical point of view, it is not economical to operate with very low proportions of acid casein granules to magnesium salt solution and for this reason, it is preferred that the amount of acid casein granules mixed with the magnesium salt solution be at least 1% by weight of the solution, and preferably at least 5 to 10%. On the other hand, if too much acid casein is placed in the magnesium salt solution, the resulting mixture becomes too viscous for convenient handling. For this reason, it is preferred that the amount of acid casein granules mixed with the magnesium salt solution be less than about 30% by weight of the solution, and especially less than about 25%. A preferred range is between about 10 and 20% and an optimum amount is about 13%.

The solution of magnesium salt must be at a temperature of at least 150° F. when the acid casein is added thereto although this temperature is lower than is preferred. For best results, the temperature of the solution should be at least 170° F., e.g., at least 180° F., to insure that the casein granules will rapidly hydrate and the undesired occluded components therein be released to the magnesium salt solution, which provides improved purity and blandness for the product. For this reason, a temperature of at least 190° F. is further preferred, and solution temperatures of from 195° F. to about 210° F. give optimum results, especially between 202° F. and 204° F.

The acid casein will rapidly hydrate in the magnesium salt solution and no extended dwell time of the casein in the magnesium salt solution is required. However, in order to insure that the undesired components of the acid casein are released from the granules, the casein/solution mixture should be stirred. Generally speaking, the stirring and heating time will be between 5 seconds and 5 minutes, but most often between 40 seconds and 2 minutes.

It should also be appreciated that at this point the casein is still at an acid pH and has not been neutralized. Neither should it be considered that the casein has been converted to a caseinate, i.e., magnesium caseinate, at least as would be conventionally conceived as a caseinate. While it appears that the magnesium salt treatment has so affected the protein linkages of the casein so as to disrupt and dispell components from the casein granules, which contribute to the undesired characteristics of the casein, the casein is still largely intact and at this point will not have all of the desired properties indicated above.

To provide all of these desired properties, the coagulum is then placed in hot water, after the washing with the cold water if desired, and with stirring the coagulum is broken to form a slurry in the hot water. The temperature of the slurry, either by reason of addition of the hot water or by heating, or by both, should be between about 100° F. and about 210° F., more preferably between about 135° F. and 185° F. An optimum temperature is about 140° F. to 160° F. At temperatures significantly below about 100° F. the magnesium base cannot effectively produce the bland neutralized casein and the other properties thereof, as discussed above, and at temperatures above about 210° F., the casein is adversely affected in taste, color and consistency.

For convenience, the coagulum/water mixture is referred to as a slurry, but the mixture also contains some colloidally suspended matter and some dissolved solids. During and after neutralization, as explained more fully hereinafter, the relative amounts of "slurried" particles, colloidally suspended matter and dissolved solids will further vary. However, for simplicity, the mixture of water and coagulum, either prior to, during or after neutralization, will be referred to as a slurry.

The total solids content of the coagulum in the slurry is not critical and has essentially no lower limit, although for economic reasons, it is preferred that the content of coagulum solids amount to at least 1% of the hot water slurry. On the other hand, the solids of the coagulum may be up to 50% of the hot water slurry. A preferred range is between about 10 and 30%, with about 20 to 25% being an optimum range.

With agitation, a magnesium base is added to the heated water slurry and the pH of the slurry is monitored. As the pH approaches neutralization, solution of undesired components from the coagulum begins to take place. The exact pH of this neutralization is, however, not critical and some latitude on either side of exact neutrality is permissible. The pH should at least be, nevertheless, within the range of about 6.0 to 8.6, but generally should be within the range of 6.4 to 7.5 or 8.0, e.g., 6.8 to 7.2. The optimum pH is about 6.9 to 7.1. However, when operating at the higher pH values, e.g., 9.3 or higher, care should be taken that undissolved base does not remain in the hot water. The amount of magnesium base required to accomplish these pH values will vary depending upon the particular acid casein, the amount thereof in the hot water slurry and the particular base being used. However, generally speaking, the amount of magnesium base will be between 0.2 and 4% of the weight of the coagulum solids in the water slurry. Preferably, however, that percentage will be between 0.8 and 3%, especially between about 1.25 and 2%. These percentages are calculated for the simplest base, i.e., MgO, which of course forms Mg (OH$_2$ in the water slurry. Accordingly, the percentages for other bases should be correspondingly adjusted for molecular weight and neutralization effect of the particular base.

Of course, as noted above, magnesium compounds other than magnesium oxide may be used in this neutralization step. Thus, for example, a water-soluble basic salt, oxide or hydroxide may be used. Accordingly, for purposes of the present specification, the term "magnesium base" is intended to include bases and base precursors, such as water-soluble basic salts and oxides, as well as the hydroxides.

On the other hand, the magnesium base cannot be replaced by any other base, save one single exception. Instead of a magnesium base, there may be used in the above-described process (and in the hereinafter described modifications of that process) a corresponding potassium base or mixtures of magnesium and potassium bases. It should be pointed out, however, that a magnesium base provides better properties to the neutralized casein than a potassium base. As opposed to the magnesium base (or potassium base), other bases are not acceptable. Thus, calcium neutralized casein, for example, does not have the complete absence of taste nor the solubility properties of the magnesium neutralized casein. The mouth-feel of calcium neutralized casein is somewhat grainy and does not blend with the mouth-feel of usual foodstuffs. The sodium neutralized casein is soapy to the taste and has an unpleasant liquid or soapy mouth-feel.

The acceptable equivalency of potassium for the magnesium in the base is also true for the neutral salt used in the prior coagulation step. Thus, instead of the magnesium salt, e.g., magnesium chloride, the corresponding potassium salt, e.g., potassium chloride, may be used.

After the coagulum has been neutralized with the base, the slurry becomes chalky white in color. Thereafter, the neutralized casein is separated from the slurry to produce a white, bland neutralized casein. The separation process may be as desired, e.g., filtering, centrifuging, evaporating, drying, etc. It is preferred that the slurry be simply dried. The slurry may be homogenized prior to drying to prevent separation of solids from the liquid during the drying step. The drying may be as desired, but preferably, spray drying is provided since this is a very fast drying technique and avoids protein burning which can take place at elevated temperature with slower drying techniques, such as vacuum pan/oven or filter/oven drying. However, when techniques other than spray drying are used, the neutralized casein should be dried at a temperature less than 190° F., especially less than 180° F. Conveniently, the homogenized slurry is spray dried in a conventional box spray dryer with a gas (usually air) inlet temperature of 290° F. to 300° F. and a gas outlet temperature of 170° F. to 190° F. Nozzle pressures can vary from between 1000 and 5000 PSIG, especially between about 1000 and 2000 PSIG, i.e., 1500 PSIG. Of course, for some applications the slurry need not be dried and can be used as is.

Figure 2:
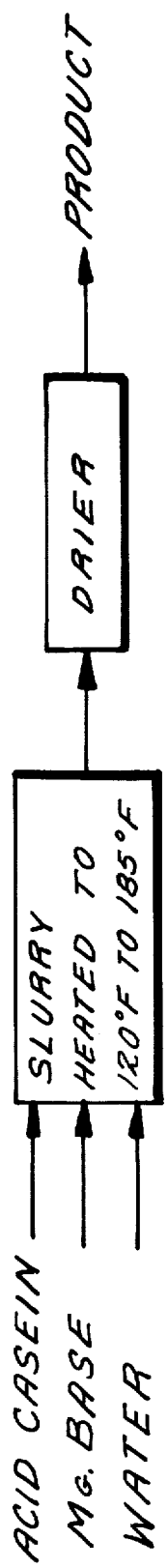
FIG. 2 is a modification of the process of FIG. 1, wherein certain of the steps are combined or eliminated.

As shown in FIG. 2, the above described process may be modified and, in some regards, simplified. However, in this modified process, the short cut results in somewhat less desired product. Nevertheless, for many purposes the product of this modified process is quite suitable. As can be seen, the modified process does not use the magnesium salt step. In other words, acid casein is slurried in hot water (120° to 185° F., as described above) and the magnesium base is added directly thereto. Neutralization takes place, as described in connection with that step, and thereafter, the product is homogenized and dried in the same manner. In this modification, the amount of acid casein corresponds to the amount of coagulum added in the process of FIG. 1 and thus, likewise, the amount of magnesium base, pH, etc. correspond. This simplified procedure eliminates the magnesium salt/coagulum forming step and consequently does not provide the additional removal of taste and consistency components performed thereby. Therefore, the product is inferior to that of the process of FIG. 1, but nevertheless does provide a product which is still much better than prior art products of a similar nature.

Figure 3:
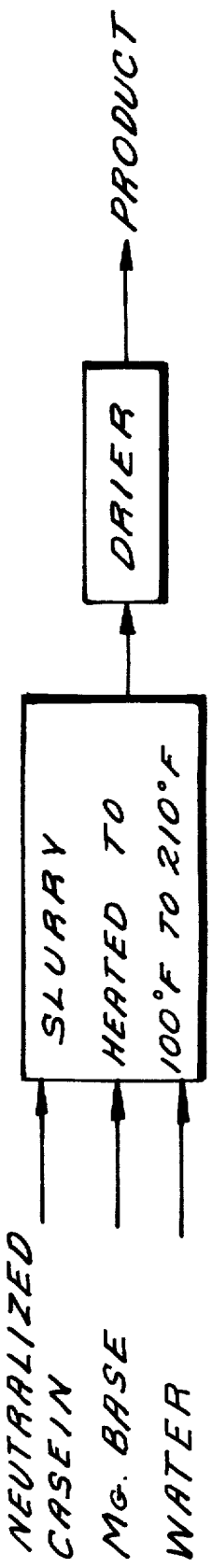
FIG. 3 is yet a further modification of the process of FIG. 1, wherein other simplifications of the process steps are provided.

As shown in FIG. 3, yet a further modification of the process of FIG. 1 may be practiced. In this modification, again, the magnesium salt/coagulum forming step is eliminated, and in addition, the starting material is an already neutralized caseinate. The neutralized caseinate, due to its prior processing history, will have provided some limited elimination of unwanted taste and consistency components. In other words, this would be a conventional and commercially available caseinate. By treating this prior art caseinate with the magnesium base, significant improvement in the blandness and lack of undesired consistency components can be obtained. However, here again, the product is inferior to that of the process described in FIG. 1. In this procedure, however, far less of the magnesium base will be required, as opposed to that of the process of FIG. 1. Generally, the amount of magnesium base will be only about 50 to 25% or less of that used in the neutraliztion step, e.g., from 20 to 10% but at least about 5% of that used in the neutralization step. Otherwise, the amount of caseinate, temperature, etc. correspond to the process of FIG. 1. In this process the neutralized caseinate may be any of the conventional alkali or alkaline earth caseinates, e.g., sodium caseinate and calcium caseinate. Thus, the term "casein" as used in the specification and claims is intended to include acid casein (produced with or without a milk clotting enzyme) and caseinates.

The three described processes produce somewhat different products. The product of the process of FIG. 1 is clearly superior while the product of the process of FIG. 2 is acceptable for most uses. The product of the process of FIG. 3 is only acceptable for the more non-discriminative uses, e.g., where a fully bland flavor, good mouth-feel and elastic characteristics are not required.

While not being bound by theory, it appears that the magnesium salt step opens the casein granules so that the subsequent magnesium base step is far more effective. The magnesium salt solution seems to have the unexpected property of causing almost explosive hydration of the casein granules which dislodges or otherwise removes undesired components and places the granules in a condition for an active effect by the magnesium base.

The magnesium base neutralization step appears to liberate undesired components from the casein and it further appears that the magnesium ion (or the potassium ion for reasonably good results) has unique characteristics in this regard. However, this is not simply a neutralization step, i.e., acid/base neutralization, as is demonstrated by the dialysis results of Example 1 below.

The invention will be illustrated by the following example, which is directed to the preferred mode of the invention, but it is to be understood that the invention is fully applicable to the foregoing disclosure.

EXAMPLE 1

Into a steam heated, jacketed mixing tank were placed 865 lbs. of water and 10 lbs. of magnesium chloride. With heating and stirring the resulting solution reached a temperature of about 200° F. Thereafter, with vigorous stirring, were added 125 lbs. of commercial acid casein on a solids basis and the mixture was stirred for 3 minutes while maintaining the temperature near 200° F. The stirring was then stopped. A coagulum formed and rose to the top of the liquid, forming a curd of bread-dough-like consistency. The pH of the curd was approximately 4.5. The curd was off-white in color, and it was apparent from the appearance, consistency and taste of the curd that significant amounts of undesired components and flavors had been removed. The jacket of the tank was heated to a temperature of approximately 220° F. and the bottom draw of the tank was opened to drain the mother liquid.

300 lbs. of the curd (containing 120 lbs. of the casein solids) were resuspended in 300 lbs. of water heated to 140° F., with stirring the curd disintergrated into a coarse slurry.

Magnesium oxide was added to this slurry and the pH was monitored. After approximately ½ hour the pH of the liquid and curd was about 7.0. About 1.6 lbs. of magnesium oxide per 100 lbs. of curd had been added to provide this pH.

The slurry passed through a Martin-Gaulin homogenizer operated at 500 PSIG and spray dried in a conventional box spray drier with a gas (air) inlet temperature of about 300° F. and an outlet temperature of about 185° F. The nozzle pressure of the spray dryer was about 1500 PSIG.

The resulting spray dried neutralized casein powder was very white in color and had essentially no taste.

An alaysis of the dried neutralized casein, on a dry basis, showed the following analysis:
Protein, 94.0%
Fat, 1.25%
Ash, 4.5%
Carbohydrate, less than 0.05%
The analysis also showed 1.25% magnesium.

Ten milliliters of a 5% solution of the product were dialyzed against one liter of doubly deionized water for 72 hours, using a cellulose dialyzer tube (Fisher Scientific Company). The membrane retains materials with molecular weights of 12,000 and higher, and has an average pore diameter of 4.8 millimicrons. The dialyzed sample was dried under vacuum at room temperature and the quantity of magnesium was determined by atomic absorption using the Perkin-Elmer's method and showed that after dialysis the magnesium content in the sample was only about $5 \times 10^{-3}\%$. The loss of magnesium on dialysis shows that the magnesium is not tied to the larger protein molecule, but is free to be removed by passing through the membrane.

EXAMPLE 2

To 100 parts of water heated to 140° F. were added 20 parts of acid casein with stirring. After a slurry was obtained 1.4% of magnesium oxide, based on the weight of the acid casein, was added with additional stirring. After about ½ hour the pH had reached about 7.0. The slurry was homogenized and spray dried in the same manner as Example 1 and the powder produced was white and relatively bland, although it had some taste, as opposed to the product of Example 1.

EXAMPLE 3

The product of Example 1 is added to nonfat dry milk solids in a ratio of 1 part of weight of the neutralized casein to 3 parts of dry milk solids. Chocolate flavor and sugar are added. The ingredients are mixed with water in a volume ratio of 1 part of the mixture to 3 parts of water and with mixing a thickened chocolate milkshake-like drink is produced.

EXAMPLE 4

A conventional muffin mix is prepared from flour, corn meal, salt, baking powder, shortening, eggs, milk and sugar. 1 Part of the product of Example 1 is mixed with 4 parts of muffin mix and 1 part water. Muffins are baked from the mixture to provide a protein rich bread.

EXAMPLE 5

Example 1 was repeated, except that potassium chloride and potassium oxide were used instead of the magnesium chloride and magnesium oxide. The product was acceptable but not as good as the product of Example 1. In another test, ½ of the magnesium chloride and magnesium oxide of Example 1 was replaced by potassium chloride and potassium oxide, respectively. The product was better than the preceding product, but not as good as the product of Example 1.

In the foregoing specification and in the following claims all proportions and percentages are by weight unless otherwise specified.

As can be appreciated from the above, the present neutralized casein is so bland that it may be incorporated into food-stuffs in large amounts. Indeed, from 1%, e.g., 5% or 10% to 30% or even 50% by weight or more may be used. Actually, the product is so bland that it may be used per se as a food-stuff, although this would not normally be done. Thus, the objects of the invention are obtained, and the following claims define the invention, although variations, apparent to the art, are intended to be embraced thereby.

What is claimed is:

1. A process for producing a bland neutralized milk casein comprising mixing milk acid casein granules with a magnesium or potassium salt solution and maintaining the mixture at a temperature of at least 150° F. until a coagulum of the casein is formed; separating the coagulum from the resulting mother liquid; forming an aqueous slurry of the coagulum and holding the temperature of the slurry at between about 100° F. and about 210° F., adding to the slurry a non-toxic, water-soluble magnesium or potassium base in an amount sufficient to neutralize the salt-treated acid casein to a pH of between 6.0 to 8.0, and separating the neutralized casein from the slurry to produce a white, bland, neutralized casein.

2. The process of claim 1 wherein the magnesium salt solution contains from 0.1 to 10% by weight of the magnesium or potassium salt, calculated as the chloride.

3. A process of claim 2 wherein the temperature of mixture is at least 180° F.

4. The process of claim 1 wherein the salt solution contains from 0.1 to 10% by weight of a magnesium salt, calculated as magnesium chloride.

5. The process of claim 4 wherein the magnesium salt is a neutral salt.

6. The process of claim 4 wherein the magnesium salt is magnesium chloride.

7. The process of claim 4 wherein the amount of casein granules mixed with the magnesium salt solution is from 1 to 30% by weight of the solution.

8. The process of claim 7 wherein the amount of casein granules mixed with the magnesium salt solution is from 5 to 25% by weight of the solution.

9. The process of claim 1 wherein the solution temperature of the salt solution is at least 180° F.

10. The process of claim 9 wherein the temperature of the salt solution is between 195° F. and 210° F.

11. The process of claim 1 wherein the temperature of the slurry is between 135° F. and 185° F.

12. The process of claim 1 wherein the base is a magnesium base.

13. The process of claim 12 wherein the magnesium base is magnesium oxide.

14. The product produced by the process of claim 1.

* * * * *